H. P. HUNTOON.
Pipe-Tongs.

No. 148,300. Patented March 10, 1874.

Witnesses.
S. N. Piper.
L. N. Moller.

Hazen P. Huntoon.
by his attorney.
R. H. Eddy.

AM. PHOTO-LITHOGRAPHIC CO. N.Y. (OSBORNE'S PROCESS.)

UNITED STATES PATENT OFFICE.

HAZEN P. HUNTOON, OF CAMBRIDGEPORT, MASSACHUSETTS.

IMPROVEMENT IN PIPE-TONGS.

Specification forming part of Letters Patent No. 148,300, dated March 10, 1874; application filed January 19, 1874.

*To all whom it may concern:*

Be it known that I, HAZEN P. HUNTOON, of Cambridgeport, of the county of Middlesex and State of Massachusetts, have invented a new and useful Improvement in Pipe-Tongs; and do hereby declare the same to be fully described in the following specification and represented in the accompanying drawings, of which—

Figure 1:
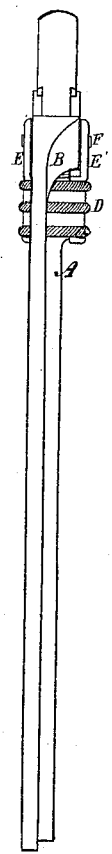
Figure 2:
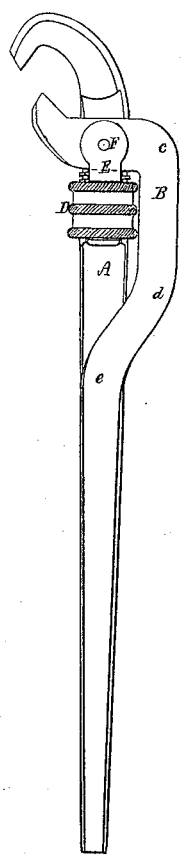
Figure 3:
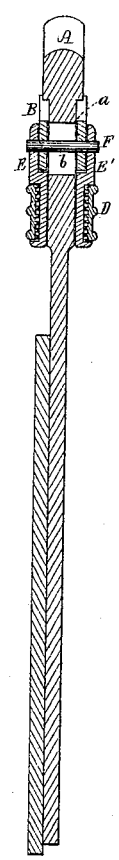
Figure 4:
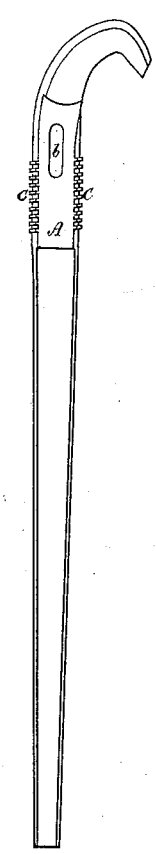
Figures 5, 6:
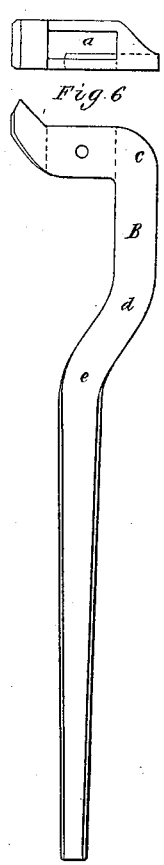

Figure 1 is a front elevation, Fig. 2 a side elevation, and Fig. 3 a longitudinal section, of one of my improved pipe-tongs. Fig. 4 is a side view of the hook-jaw lever, showing its slot and screw, the latter being formed on its opposite edges, in order for the fulcrum-supporters to be arranged, as shown, in the rotary screw-nut and against the shank of the lever. Fig. 5 is a top view, and Fig. 6 an edge elevation, of the tooth-jaw lever.

The invention relates to a certain arrangement and construction of the parts, whereby the tongs may be easily manipulated and the jaws adjusted to advantage while the tongs may be in use.

In such drawings, A denotes the hook-jaw lever, and B the tooth-jaw lever, one of said levers being slotted to receive the other, which passes through the slot shown at *a*. On the shank of the hook-jaw lever a male screw, C, is cut or formed, to receive a milled nut, D, that screws upon the screw, the said nut being connected with, or pivoted to, or made to embrace, two fulcrum-supporters, E E', arranged on opposite sides of the hook-jaw lever, and recessed, as shown, to receive the nut. These fulcrum-supporters extend up on opposite sides of the jaw-levers, and receive and support the fulcrum-pin F, which goes through them and a slot, *b*, formed lengthwise in the shank of the hook-jaw lever, all being substantially as shown in the drawings. The tooth-jaw lever, back of its fulcrum, is bent down with an elbow, as shown at *c*, into or about in parallelism with the shank of the other jaw-lever, after which it is bent laterally, as shown at *d*, so as to lap upon the shank of the hook-jaw lever. From thence it is bent, as shown at *e*, so as to extend down alongside the front of and upon the shank of the hook-jaw lever, all being as represented, and in order to enable a workman to steady the tooth-jaw lever by the two shanks so lapped, and grasp them and work the tongs to better advantage than he could were the shank of the tooth-jaw lever straight beyond its elbow or first bend.

On taking hold of the nut and revolving it on the screw, the tooth-jaw may be turned either nearer to or farther from the hook-jaw, or adjusted with reference thereto, as circumstances may require.

I do not claim, broadly, pipe-tongs provided with means of supporting and adjusting the fulcrum; nor do I claim the tooth-jaw supporters simply extended upward underneath the tooth-jaw lever without lapping on them, and from being pivoted to the tooth-jaw lever. When the tooth-jaw lever is not pivoted to the fulcrum-supporters, it becomes loose on the other jaw-lever, and works and wears thereon and on the supporters to disadvantage.

I claim—

1. In the pipe-tongs, the two separate fulcrum-supporters E E', the rotary nut D, and the screw C, combined and arranged with the hook-jaw lever A, as set forth.

2. The jaw-lever A, the screw C, the nut D, the fulcrum-pin F, slot *b*, and its supporters E E', combined and arranged substantially as described, in combination with the toothed-jaw lever B, bent, as represented at *c d e*, to extend down by the nut and lap upon the hook-jaw lever, all as shown and described.

HAZEN P. HUNTOON.

Witnesses:
R. H. EDDY,
J. R. SNOW.